Figure 1:
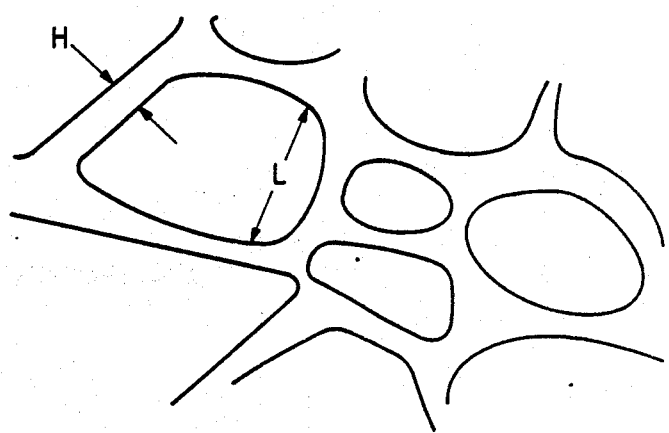

United States Patent [19]

Blundell et al.

[11] Patent Number: 4,919,992
[45] Date of Patent: Apr. 24, 1990

[54] PROCESS FOR MAKING MICROPOROUS PRODUCTS AND THE PRODUCTS THEREOF

[75] Inventors: David J. Blundell, Middlesbrough; Frederic N. Cogswell; Peter J. Meakin, both of Guisborough, all of England

[73] Assignee: Imperial Chemical Industries PLC, London, England

[21] Appl. No.: 214,391

[22] Filed: Jul. 1, 1988

[30] Foreign Application Priority Data

Jul. 2, 1987 [GB] United Kingdom ................. 8715530

[51] Int. Cl.$^5$ .......................... B32B 3/26; B32B 31/00
[52] U.S. Cl. ................................. 428/131; 264/288.8; 428/304.4; 428/315.5; 428/318.4; 428/419
[58] Field of Search ..................... 264/288.8; 428/419, 428/131, 315.5, 315.7, 315.9, 318.4, 304.4

[56] References Cited

U.S. PATENT DOCUMENTS 3,892,425  7/1975  Sakairi et al. .................... 428/315.5
4,613,544  9/1986  Burleigh ........................... 428/315.5

Primary Examiner—William J. Van Balen
Attorney, Agent, or Firm—Cushman, Darby & Cushman

[57] ABSTRACT

A process of producing a structural network from a semicrystalline, melt crystallizable polyarylene ether or polyarylene thioether comprising providing a molten mixture of at least one semicrystalline polymer in the presence of a melt plasticizer for the polymer which melt contains at least some polymer entities having a crystalline form, the total polymer concentration being between 5 and 50% by weight of the mixture of polymer and melt plasticizer, and heating the mixture of polymer and melt plasticizer at a heating rate of between 1° C./hour and 1000° C./hr, preferably between 10° C./hour and 100° C./hour until the mixture is at a temperature in the range 10° C. below to 20° C. above its clearing point and cooling the mixture until it solidifies whereby an open cell structure essentially free from granular superstructure is obtained.

19 Claims, 2 Drawing Sheets

PROCESS FOR MAKING MICROPOROUS PRODUCTS AND THE PRODUCTS THEREOF

This invention relates to a process of converting semicrystalline polymers, particularly semicrystalline aromatic polymers such as semicrystalline poly(aryl ethers) into novel physical forms and the products obtained therefrom.

In one aspect the invention relates to providing open cell, porous products which provide useful products, particularly as intermediates for further processing.

According to the invention there is provided a process of producing a structural network from a semicrystalline, melt crystallisable polyarylene ether or polyarylene thioether comprising providing a molten mixture of at least one semicrystalline polymer in the presence of a melt plasticiser for the polymer which melt contains at least some polymer entities having a crystalline form, the total polymer concentration being between 5 and 50% by weight of the mixture of polymer and melt plasticiser, and heating the mixture of polymer and melt plasticiser at a heating rate of between 1° C./hour and 1000° C./hr, preferably between 10° C./hour and 100° C./hour until the mixture is at a temperature in the range 10° C. below to 20° C. above its clearing point and cooling the mixture until it solidifies whereby an open cell structure essentially free from granular superstructure is obtained.

Preferably the process comprises heating the semicrystalline polymer in the presence of a melt plasticiser for the polymer to give a homogeneous melt of the mixture, cooling the melt until the onset of crystallisation is reached and the melt becomes cloudy, subsequently reheating the mixture of polymer and melt plasticiser at a heating rate of 1° C./hour to 1000° C./hr, preferably between 10° C./hour and 100° C./hour until the mixture is at a temperature in the range 10° C. below to 20° C. above its clearing point and cooling the mixture until it solidifies.

The melt crystallisable polymer should preferably be such as to give a degree of crystallinity of at least 20% when cooled from the melt. The polymer should be a polyarylene ether or thioether in which at least 50% by weight and preferably at least 80% by weight of the units in the polymer chain are of the formula -Ar-X-, wherein Ar is an arylene radical and X is oxygen or sulphur.

The "clearing point" of the mixture is defined as the temperature at which the mixture changes from a turbid to a clear melt. It is preferred that cooling is commenced within the range 5° C. below to 10° C. above the clearing point.

The clearing point is best determined by forming a homogeneous melt of polymer in the melt plasticiser and then cooling this melt until it has become turbid because crystallisation of the polymer has commenced. At this point the mixture is then reheated at a rate of about 30° C./hr. The first observation that the clearing temperature is being approached is that the mixture becomes translucent. This usually occurs at about 20° C. below the clearing temperature. As the temperature is increased the translucent appearance changes to give a clear solution at the clearing temperature (Tc).

As a convenient method for helping to identify the clearing temperature, mixtures of polymer and melt plasticiser of the same proportions can be examined in a Differential Scanning Calorimeter (DSC). In this case it is convenient to load the mixtures into a sealable sample pan such as the standard aluminium pans supplied by Mettler, so as to reduce the risk of contaminating the DSC instrument with evaporating plasticiser. The mixture can then be scanned through a temperature cycle that simulates the experimental procedure. First the sample should be scanned at 20° C./min to a temperature at least 50° C. above the melting point of the polymer. After allowing 2 minutes for the melt to equilibrate, the sample should be cooled at 20° C./min to below the crystallisation exotherm of the polymer. The sample should then be reheated into the melt state. If the melt plasticiser is itself a crystallisable substance, it is possible that the reheat scan will first show the endotherm associated with the melting of the plasticiser; the melting of the polymer component will occur as a separate process at a higher temperature. For mixtures of the polymer PEEK with melt plasticiser diphenyl sulphone, it has been established that if 10 mg of mixture are examined in a Mettler TA3000 DSC, then the peak temperature of the polymer melting endotherm is a very good guide to within experimental error to the clearing temperature when the mixture is heated in a stirred vessel according to the above procedure.

The mixture of semicrystalline polymer and melt plasticiser should preferably contain an excess of melt plasticiser, for example in the weight ratio of polymer to plasticiser in the range 1:1 to 1:20, preferably in the range 1:3 to 1:7.

The molten product may be cooled by any convenient technique depending on the physical form required. Thus prior to or after the cooling step it may be cast in the form of a thin film or a slab of material whilst the mixture is fluid, or yet again may be dispersed in a liquid. The cooled product may be used in the form retaining the plasticiser or the plasticiser may be extracted by leaching or evaporation to form a low density network structure consisting essentially of the polymer.

The unusual physical nature of the network provides a useful product, particularly as an intermediate product for further processing. The invention is seen as of particular value for providing novel forms of high performance semi-crystalline aromatic polymers, particularly semi-crystalline poly(aryl ethers).

The novel structure of, for example, a semi-crystalline polyketone produced by the process of the invention can be characterised as an open cell product having an average pore size of less than 10 microns, preferably less than 3 microns and even more desirably less than 1 micron, the product having a pore volume fraction of at least 0.5 but less than 0.95, and preferably in the range 0.7 to 0.9. The structure is further defined as a structure of thin connected entities, the entities having a sectional diameter (H) of less than 1 micron and preferably less than 0.25 microns and a length L, approximating to the pore size, wherein H and L are related so that H lies in the range 0.05 L to 0.5 L and wherein the structure is essentially 3-dimensionally uniform. Similar structures are obtainable from other poly(arylene ethers) and poly(arylene thioethers).

Figure 2:
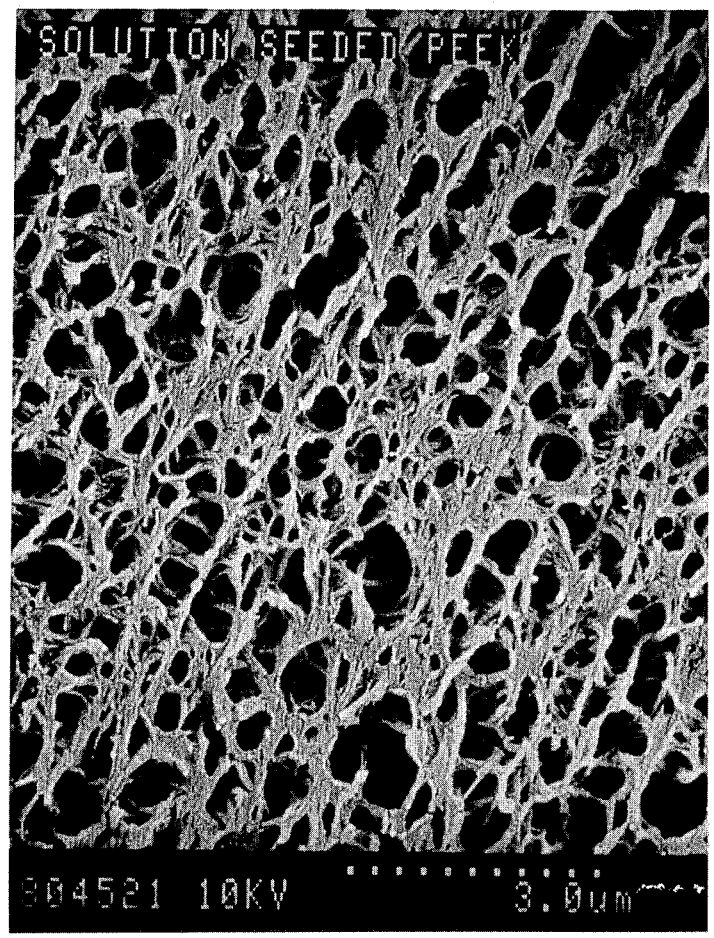

The structure produced is illustrated diagrammatically in FIG. 1. FIG. 2 shows an electron micrograph of a typical structure produced. (Run 1 of Example 1.)

The three dimensional interpenetrating nature of the open cells of the microporous structures and the broad size distribution present difficulties in precisely defining the size of the pores. The essential part of these structures is the basic structural building entities that join together to form the primitive pores of the open cell structure. The diameter of the primitive pores will be of the same order of magnitude as the length of the basic building entities.

SEM micrographs readily allow a direct visual assessment of the dominant range of pore diameters and of the average sectional diameters of the basic entities making up the microporous structure. Alternatively the pore sizes can be assessed statistically using an automatic image analyser such as supplied by Kontron. Such analyses provide an average cell diameter and a standard deviation. The results in Example 1 show that due to the broad size distribution, the standard deviation can be comparable in magnitude to the computed average. The results also show that the computed mean diameter is usually very close to the upper end of the pore diameters perceived by visual observation.

After extraction of the melt plasticiser from the microporous product, X-ray diffraction photographs show the same features of crystalline order to that shown when the same polymer has been crystallised directly from the melt. The crystallinity can also be measured by monitoring the melting endotherm of the polymer crystals by Differential Scanning Calorimetry (DSC). If the extracted microporous product is loaded into a DSC sample pan without being crushed, then the polymer melting process during a heating scan will often take the form of two discrete endothermic processes. If however the extracted product is first crushed and compressed into a pellet, a single melting endotherm is usually observed in the same temperature region. The double endotherm of the uncrushed case appears to be a consequence of the microporous structure, probably due to its poor heat conduction. The total area of the melting endotherm of the crushed case and of the pelletised case are the same within experimental error and are both usually larger than the endotherm areas of the same polymer when crystallised directly from the melt. For example, for microporous products made from polyetheretherketone (PEEK) in the manner of the invention the heat of fusion of the melting endotherms have been observed to be greater than 60 J/g of sample weight. This compares with melt crystallised samples of PEEK, where it is rare to find heats of fusion greater than 50 J/g. These DSC observations indicate that the microporous products made by the above procedure are usually substantially more crystalline than products crystallised from the melt state.

The open cell structure as prepared will comprise the interconnecting entities of polymer and pores containing the melt plasticiser used in the process. The melt plasticiser may remain whilst the structure is subjected to further processing steps or may be wholly or partially removed, for example by leaching out by a material inert towards the semi-crystalline polymer.

The presence of at least some melt plasticiser or other liquid may be useful, for example, in a process in which the open cell structure is stretched or compressed, preferably at an elevated temperature between the glass transition temperature of the polymer and the clearing temperature. The stretching may be uniaxial or biaxial stretching. Such a process can result in the section of the entities becoming smaller and the shape of the pores becoming elongated. Sufficient stretching results in enhancement of the properties of the matrix polymer through increased orientation. This additional ability to control the properties and structure of the product extend to usefulness of the product when it is used in a form which retains the product in the form of an open cell structure.

The open cell structure may be used as a filtration material (after the melt plasticiser has been substantially removed) or the product may be used as a network structure and the pores, when substantially freed of melt plasticiser, filled with other materials, such as other polymeric material, preferably introduced as curable compositions, and cured within the pores.

The product also enables a very fine particle size product to be obtained. There are many applications such as powder coating and powder impregnation of fibrous materials where very fine particle powders are highly desirable. It is not always possible to produce such products directly in a polymerisation process, particularly when the particle size required is less than 5 microns. Alternative procedures for producing such powders rely on being able to grind the products of the polymerisation process in a comminution process. Not only is this a costly process but when the polymer is a highly tough material, such as a high molecular weight poly(aryl ether), it is not easily possible to obtain the desired, fine particle size. The open cell network structures of the present invention can be ground up with relative ease, especially in the presence of the melt plasticiser, to provide fine particle products having a mean size of less than 5 microns, preferably less than 2 microns. If required the particles may be leached after disintegration to give a fine powder free of the plasticiser.

The ability to produce finely divided and even submicron powders from polyarylene ether polymers, such as polyetheretherketone, is particularly useful because it is extremely difficult to obtain such powders by grinding processes if the polyetheretherketone (PEEK) has a sufficiently high molecular weight to be tough. Polyarylethers such as PEEK are of particular value as matrix materials in continuous fibre composites because of their exceptional environmental resistance. The provision of the fine powders described above enables composites to be produced by impregnating continuous rovings of fibres with the powder and subsequently compressing the impregnated structure under conditions wherein the polymer is molten to give a consolidated composite material.

The fine particles of the present invention enable an intermediate product to be produced which has the additional capability of being a drapable material. Thus after the impregnation of polymer powder into the continuous fibres the impregnated structure can be heated above the melting point of the polymer powder, under conditions which do not consolidate and squeeze out trapped air, to provide an impregnated structure having sufficient integrity to be handled without the structure falling apart, but which, nevertheless, is drapable to the extent that on draping it over a cylindrical rod of diameter 1 cm the structure will conform to the surface of the rod (the upper hemi-surface of the cylinder) under its own weight.

Microscopic examination of such structures shows that using between 10 and 50% by volume of polymer, structures are produced in which at least 50% of the surface of the filaments are coated with a thin film of polymer and in which occasional 'bridging' points of polymer linking two or more filaments provides integrity to the structure. In addition, to passing the drape test described, these structures can be wound round the 1 cm diameter rod and in many cases very closely approach the drapability of the fibre prior to impregnation. The property of drapability in composites is considered to provide a useful additional feature in that shapes of complex shape can sometimes be fabricated more easily than forming a shape from a preconsolidated (and stiff) prepreg composite.

The drapable composite materials of the invention comprise an open fibrous structure of continuous filaments and a polyarylene ether or polyarylene thioether wherein the structure contains between 10 and 50% by volume of polymer, at least 50% of the surface area of the filaments is coated by the polymer and the integrity of the structure is maintained by the polymer being attached at a plurality of points to two or more filaments. After these structures have been laid up to form an article of the desired shape the open structure is consolidated by heat and pressure to a consolidated shape.

Fine fibrils can be obtained if the network product is subjected to a stretching process, preferably at elevated temperature, after the initial cooling from the melt so that the section of the interconnecting entities is reduced. Such a highly fibrillar product can be disintegrated into fibrillar form to give microfine, oriented fibrils. These are useful intermediate products, for example, for laying down as a mat of random fibrils to form a paper, for example for electrical insulation. The fibrils of the paper can be at least sufficiently fused, by treatment at elevated temperature, to give the paper integrity or they may be completely fused to form a coherent film.

The provision of open cell products of fine interconnecting entities gives a basis for numerous applications for the product, particularly when the product is a semi-crystalline product with high levels of performance, such as poly(aryl ethers). For example, the invention can provide filter materials of high solvent and heat resistance when appropriate polymers are chosen. When the material is used as a structural foam materials with high fire and solvent resistance can be chosen. When used as a structural foam the network structure of the invention can be used as the core in a sandwich structure, with load bearing skins of fibre reinforced materials laminated on either side of the core.

Although a major benefit of the invention is the ability to fabricate useful end products consisting of interconnecting networks, fibrils or fine powders from polymers, which are difficult or impossible to fabricate in these forms by other methods, the invention is not limited to the use of such difficult to fabricate materials.

As indicated the products of the invention will find applications dictated by the properties of the polymer used. Post treatment of the network structure will extend the nature of these applications. For example, if a hydrophobic surface is required and the polymer used is insufficiently hydrophobic, a post treatment of the pore surface with a hydrophobic material can be used.

Suitable polyarylene ethers or thioethers may be sulphonated prior to or after the formation of the network structure of the invention to make them particularly suitable for membrane applications.

The invention is further described with reference to the following examples.

EXAMPLE 1

A 500 ml 3-necked round bottomed glass flask provided with a stirrer, nitrogen inlet, nitrogen outlet and with heating provided by a surrounding molten metal bath was preheated to 200° C. and was then charged with 300 g of a mixture of 5 parts by weight of diphenyl sulphone and 1 part by weight of a polyetheretherketone (PEEK) polymer. The PEEK polymer had a melt viscosity of 100 Ns/m$^2$ measured by capillary flow at 400° C. and at an apparent shear rate of 1000 sec$^{-1}$. The heating of the flask was controlled and programmed using a West 2050 programmable controller. The temperature of the mixture was raised under a nitrogen blanket with continuous stirring at 60 rpm to 351° C. at which temperature a uniform plasticised melt was formed. On cooling the mixture whilst still stirring it became cloudy at 242° C. This cloudy mixture was further cooled whilst continuing stirring to 184° C.

This mixture was then heated at a rate of 30° C./hr to a temperature of 282° C. This temperature had previously been determined as the clearing temperature, $T_c$, for this sample of polymer. The clear solution was held at this temperature (holding temperature) for 90 minutes before cooling to ambient temperature at about 150° C./hr. The product was in the form of a microporous product of high rigidity making it readily handleable for further fabrication or processing operations.

The structure of the microporous product was characterised using image analysis on sections of the product examined in a scanning electron microscope. The electron microscope is operated so as to eliminate geometric effects and is calibrated so as to give measurement within ±5%. The image produced is taken into the frame store of a Kontron automatic image analyser which uses computer based enhancement techniques to recognise the pores. The parameters measured were "D-circle" and "D-max". "D-circle" is the diameter of a circle of equal area to the pore being measured. "D-max" is the dimension of the maximum included chord. Normal mean and standard deviation are computed, and a frequency/size bar graph plotted. The method gave a pore size (D) of 0.89 microns (standard deviation 0.79 microns). An electron micrograph of this product is reproduced as FIG. 2.

The procedure was repeated to evaluate the effect on the structure of using a holding temperature both above and below the actual clearing temperature, but using otherwise identical conditions to those described above. The table below records the effects observed on the structure of the product produced depending on the holding temperature used.

TABLE 1

| Run | Seeding Temp. °C. | Relationship to Clearing Temperature | Pore Size μm | Material Appearance |
| --- | --- | --- | --- | --- |
| 2 | 262 | $T_c - 20°$ C. | — | Granular |
| 3 | 272 | $T_c - 10°$ C. | — | Granular/Microporous |
| 4 | 277 | $T_c - 5°$ C. | 0.42 (0.26) | Microporous |
| 1 | 282 | $T_c$ | 0.89 (0.79) | Microporous |
| 5 | 292 | $T_c + 10°$ C. | 0.78 (0.89) | Microporous |
| 6 | 297 | $T_c + 15°$ C. | 2.02 (1.87) | Microporous/spherulitic |
| 7 | 302 | $T_c + 20°$ C. | — | Granular |

(Standard deviation in parentheses)

In Table 1 'the term 'granular' means that the product contains large spherulites of about 5 microns and typically 20μ or more in diameter or similar size masses of apparently undissolved polymer. This situation relates to materials produced outside the range $T_c+20°$ C.

As the $T_c$ is approached from a lower temperature a structure which has both granular and porous entities is formed. This results from partial melting of spherulites produced in the first heat/cool cycle. The unmolten material remains as granules, while dissociated crystallites act as nuclei for spherulites.

A material described as porous has the appearance of an open cell sponge. No spherulitic texture is determinable by scanning electron microscopy (SEM) examination. It is therefore likely that the nucleation density is so high that recognisable spherulites as such do not have a chance to form. For this type of structure to occur it is advantageous to work in the range $T_c-5°$ C. to $T_c+10°$ C. (ie 277°−292° C. for 100P PEEK).

When a material is described as porous, but spherulitic, we means the basic structure is still open cell foam, but close examination by scanning electron microscopy reveals lamella radiating structures which are typical of spherulites in their earliest stages of formulation.

Materials which are described as spherulitic or granular with a structure size around or above 2 μm have an appearance typical of well formed spherulites.

EXAMPLE 2

The procedure of Run 1 in Example 1 was followed except in that the rate of heating between 184° C. up to the clearing temperature (282° C.) was changed from 30° C./hour to 2° C./hour. The product produced was microporous as in the product of Run 1 but pore size obtained was smaller being measured as D=0.21 microns with a standard deviation of 0.14 microns.

EXAMPLE 3

The microporous product of Run 1 of Example 1 was comminuted by the following procedure. The product was produced in the form of a slab by pouring the contents from the flask into a tray whilst the contents were mobile and after the holding period. The product was hammer milled to produce coarse porous granules about 500 microns in size.

The main stage of the milling was carried out using a Glen Creston Dyno mill type KDL laboratory scale bead mill. This consists basically of a stainless steel agitator in a water cooled glass sleeve. Zirconium oxide beads, 2 mm in diameter, were used as the grinding medium. The mill was charged with a mixture of 30% by weight of the hammer milled product in water containing 1% by weight of 'Synperonic' OP 10 EO surfactant (an ethylene oxide/oxtyl phenol condensate).

The mill was operated in a batch mode for 10 hours. A product of particle size of approximately 1 micron was formed.

EXAMPLE 4

A sample of the product of Run 1 of Example 1 was cast into a thin film by pouring the fluid mixture at the end of the holding period onto a glass plate. The film was very white. The diphenyl sulphone (DPS) content of the thin film was removed by leaching with acetone to give a microporous film of PEEK, substantially free of diphenyl sulphone. This film was stretched uniaxially at room temperature. Microscopical examination showed that the connecting entities in the porous structure had been elongated to ultra fine fibrils.

EXAMPLE 5

The product of Run 1 of Example 1 was cast as a block 20 mm square by 10 mm thick. The DPS was leached from the block. The microporous block formed a rigid structure.

EXAMPLE 6

The experimental procedure described in Example 1 was repeated on mixtures of PEEK polymer and diphenyl sulphene (DPS) using the quantities listed in Table 2. The melt viscosity of the polymer used for runs 1 to 9 was 100 Ns/m² as measured by capillary flow at 400° C. and an apparent shear rate of 1000 sec$^{-1}$ In runs 10 and 11 a polymer of melt viscosity 180 Ns,/m² was used. Run 12 used a polymer of melt viscosity 380 Ns/m². After the mixtures had been held at the holding temperatures indicated in Table 2, the solution was poured into aluminium foil trays and allowed to cool naturally to room temperature. The Table also indicates DSC endotherm peaks $T_p$. These give a good indication of the clearing temperature for each of the mixtures. Small blocks were cut from the cooled, solidified products, washed in acetone and examined in a

TABLE 2

| Run | Concentration Wt % | DSC $T_p$ °C. | Holding Temp. °C. | Type of Structure | Pore Size μm | Sectional Dia. of Entities μm | Diameter of Granules μm |
|---|---|---|---|---|---|---|---|
| 1 | 30 | 294 | 294 | Microporous | .4–2 | 0.2 | — |
| 2 | 16.7 | 279 | 287 | Microporous | 0.8–3 | 0.2 | — |
| 3 | 10 | 274 | 285 | Microporous | 1.5–8 | 0.2 | — |
| 4 | 5 | 272 | 282 | Three Layers | | | |
| | | | | Middle Layer: Microporous PEEK | 1–3 | .3 | — |
| | | | | Top Layer: Mainly DPS | | | |
| | | | | Bottom Layer: Mainly DPS | | | |
| 5 | 2 | 271 | 290 | Three Layers | | | |
| | | | | Middle: Microporous PEEK | 0.6–3 | .2 | — |
| 6 | 1 | 270 | 288 | Three Layers | | | |
| | | | | Middle: Microporous PEEK | 0.7–3 | .25 | — |
| 7 | 30 | 294 | 334 | Granular | — | — | 16–18 |
| 8 | 10 | 274 | 363 | Granular | — | — | 20 |
| °9 | 5 | 272 | 363 | Three Layers | | | |
| | | | | Middle Layer: Granular PEEK | — | — | 20–50 |
| | | | | Top Layer: Mainly DPS | | | |
| | | | | Bottom Layer: Mainly DPS | | | |
| 10 | 16.7 | 276 | 287 | Microporous | 0.5–1 | 0.15 | — |
| 11 | 10 | 274 | 289 | Microporous | 1–3 | 0.3 | — |
| 12 | 16.7 | 277 | 288 | Microporous | .6–1 | .15 | — | scanning electronmicroscope. The appearance and size of the structures observed by eye are summarised in the Table 2, in terms of the range of pore sizes and the sectional diameter of the connecting entities.

Comparison of the pairs of runs 1 with 7, 3 with 8 and 4 with 9 demonstrate that it is essential to use a holding temperature close to the clearing temperature in order to achieve a fine microporous structure rather than a course granular structure.

Runs 4, 5 and 6 demonstrate that it is preferable to use a concentration above 5% in order to obtain a consistently uniform microporous structure throughout the product. In these three preparations, the product was observed to have separated into three layers in the aluminium trays; only the middle contained the PEEK polymer in microporous form, the top and bottom layer consisting predominantly of solidified diphenyl sulphone.

Runs 3, 11 and 12 demonstrate that the ability to form a microporous structure is insensitive to the melt viscosity of the PEEK polymer.

EXAMPLE 7

A blend of one part PEEK to five parts DPS was placed in a heated reaction vessel and stirred. A West 2050 programmable controller was used to control the temperature of a solder bath which acted as a heat source for the reaction. The initial temperature of the bath was 190° C. and hence the DPS fraction was molten. The mixture was further heated to a point where the PEEK was completely dissolved in DPS. It was then cooled to 200° C. where the PEEK fully crystallised and phase separated. From here it was slowly reheated to its clearing point, which in this case was determined to 281° C.

Once the seeding temperature had been reached, part of the material was transferred to a vessel maintained at 30° C. in an oil bath. The remainder was poured into an aluminium tray and crystallised in the normal way. Once the material in the hot vessel cooled to 230° C. rapid crystallisation of the PEEK took place, leaving the DPS still molten. After roughly 30 mins. at this temperature the vessel was removed from the oil bath and cooled.

Both material set into solid slabs of similar appearance. They were both subsequently prepared and examined by scanning electron microscopy. Both had a micro-porous structure which were similar in appearance.

EXAMPLE 8

Materials seeded at 262°, 272°, 277°, 282°, 287°, 292°, 297 and 302° C. were examined by Mercury Porosimetry (intrusion/ extrusion). The surface area, porosity and deduced mean pore sizes of this range of materials are summarised in Table 3 below.

TABLE 3

| Seeding Temp °C. | Surface Area ML/G | Pore Vol ML/G | Mean Pore Size (μm) |
|---|---|---|---|
| 262 | 130 | 2.25 | 0.60 (Broad Range) |
| 272 | 140–155 | 2.53 | 0.24 |
| 277 | 75–90 | 3.12 | 0.5 |
| 282 | 94–107 | 3.88 | 1.0 |
| 287 | 80–95 | 2.68 | 1.3 |
| 292 | 80–93 | 2.93 | 1.6 |
| 297 | 66–110 | 2.89 | 4.5 |
| 302 | 60 | 2.17 | 18.0 |

It should be noted that all the materials have very high apparent pore density (>2 ml/g). Samples at seeding temperatures 272° C.–302° C. show a dependence of pore size upon seeding temperature, but material seeded at 262° C. is different in that there is a broad distribution of pore sizes. This is probably a reflection of its granular nature.

Mercury entrapment is very high, the minimum value seen is 87%. A value of 25% is typical for catalysts.

EXAMPLE 9

A blend containing one part of PEEK to five parts DPS was seeded in the manner of Example 1. Upon reaching the clearing point this material was accurately cast into 12 mm×12 mm cubes. The DPS was extracted using solvent to level the microporous PEEK network.

The PEEK cubes were subjected to a compression test in an Instron model 1122 using a rate of compression of 2 mm/min. An average "tangent" modulus of 69.9 MPa was recorded, with a typical yield stress of 2.09 MPa.

EXAMPLE 10

Micro-porous PEEK/DPS in the ratio 1.5 prepared according to Example 1 was milled in the presence of water to form a suspension containing 20% by weight solids according to the procedure of Example 3. The particles had a mean size of about 1 micron.

A single 12 k·tow of carbon fibres was spread using an air-jet, and was subsequently passed through the suspension. The resulting material was dried whilst still in this spread state. Final consolidation was achieved by melting the PEEK/DPS over a hot plate at 400° C.

This procedure produced an open web of material roughly 2.5 cm wide containing about 55% by weight of fibre. This tape exhibits a high level of "drape". A 10 cm length of the 2.5 cm wide tape was placed over a cylindrical rod of diameter 1 cm. The tape behaved in the same way as the unimpregnated 12K tow and conformed exactly to the curvature of the upper hemi-cylinder of the rod.

Optical micrographs of the structure of the tape showed the polymer was essentially distributed over the filament surfaces with these surfaces being essentially fully coated with a thin film of polymer. It was apparent from the micrographs that the filaments were held in the integral web by 'bridging' points of polymer which contacted adjacent filaments.

EXAMPLE 11

Using the same equipment and experimental approach described in Example 1, 50 g of Ryton VI grade poly(phenylene sulphide) was mixed with 250 g of diphenyl sulphone. The mixture was reheated to a holding temperature of 287° C. and poured into an aluminium tray to solidify on cooling. Prior to this experiment a 10 mg sample mixture of the same proportions had been heated in a Mettler TA 3000 DSC and was found to exhibit a polymer melting endotherm with a peak at 247° C. This indicates that the holding temperature was about 40° C. above the clearing temperature. Examination of the product by scanning electronmicroscope showed that the polymer component was in the form of granules with a diameter of about 10 μm.

The experiment was repeated using the same quantities of polymer and diphenyl sulphone with the exception that a holding temperature of 248° C. was used. This was very close to the clearing temperature of the solution. Examination of the product showed that the polymer component was in the form of a microporous structure made of connecting entities about 2 μm long and 0.5 μm thick.

EXAMPLE 12

Using the same procedure as Example 1, 50 g of Victrex 220G grade of polyetherketone (PEK) was mixed with 250 g of diphenyl sulphone. Previous to this experiment a 10 mg mixture of the same proportions had been heated in a Mettler TA3000 DSC and found to give a polymer melting endotherm with a peak at 301° C. In the main experiment, the mixture was reheated to a holding temperature of 302° C. before casting into an aluminium tray. Examination by scanning electronmicroscope revealed the polymer had formed a microporous structure with an average pore size of about 0.8 μm with connecting entities with a sectional diameter of about 0.2 μm.

EXAMPLE 13

Using the procedure of Example 1, 30 g of poly(ether-ketone-ether-ketone-ketone) (having the repeat unit -EKEKK-) with a melt viscosity of 200 Ns/m² was mixed with 120 g of diphenyl suphone. Previous DSC experiments showed that this mixture had a polymer melting point of 319° C. The mixture was reheated to a holding temperature of 320° C. and then cast into an aluminium tray to solidify. Examination with a scanning electronmicroscope showed that the polymer had formed a microporous structure with pore sizes ranging from 0.3 to 1μ with connecting entities with a sectional diameter of about 0.1μ.

We claim:

1. A process of producing an open cell structure network from a semicrystalline, melt crystallisable polyarylene ether or polyarylene thioether comprising providing a molten mixture of at least one such semicrystalline polymer in the presence of a melt plasticiser for the polymer which melt contains at least some polymer entities having a crystalline form, the total polymer concentration being between 5 and 50% by weight of the mixture of polymer and melt plasticiser and heating the mixture of polymer and melt plasticiser at a heating rate of between 1° C. and 1000° C./hour, until the mixture is at a temperature in the range 10° C. below to 20° C. above its clearing point and cooling the mixture until it solidifies, whereby an open cell structure essentially free from granular superstructure is obtained.

2. A process of producing an open cell structure network according to claim 1 comprising melting the semicrystalline polymer in the presence of melt plasticiser for the polymer to give a homogeneous melt of the mixture, cooling the melt until the onset of crystallisation is reached and the melt becomes cloudy, subsequently reheating the mixture of polymer and melt plasticiser at a heating rate of 1° C./hour to 1,000° C., until the mixture is at a temperature in the range 10° C. below to 20° C. above its clearing point and cooling the mixture from a temperature in this range until it solidifies.

3. A process of producing a structural network according to claim 1 wherein the subsequent reheating is conducted to a temperature in the range 5° C. below to 10° C. above the clearing point.

4. A process according to claim 1 in which the product is cast while the mixture is still fluid.

5. A process according to claim 4 in which the cast product is subjected to stretching or compression.

6. A process according to claim 5 wherein the operation is performed at a temperature above the glass transition temperature of the polymer of the product.

7. A process of producing an open cell, structural network according to claim 1 in which the melt plasticiser is substantially completely removed from the structure after the open cell structure has been formed.

8. A process according to claim 7 in which the network structure is reimpregnated with a polymer or precursor materials for forming a polymer within the pores of the network.

9. An open cell, 3-dimensionally uniform structure of a semi-crystalline polyarylene ether or polyarylene thioether having an average pore size of less than 10 microns, the product having a pore volume fraction of at least 0.5 but less than 0.95, the structure comprising thin connected entities, the entities having a sectional diameter (H) of less than 1 micron and a length L, approximating to the pore size, wherein H and L are related so that H lies in the range 0.05 L to 0.5 L, and the pores are substantially filled with a melt plasticiser for the polymer.

10. An open cell semi-crystalline polymer product according to claim 9 from which the melt plasticiser has been substantially completely removed.

11. An open cell semi-crystalline polymer product according to claim 10 in which the pores are at least partially filled with a different polymeric material.

12. An open cell structure obtained by drawing the products of claim 9 to orientate the polymer of the open cell structure and reduce the section of the connecting entities.

13. An open cell product according to claim 12 which has been drawn at a temperature above the glass transition temperature of the semi-crystalline polymer.

14. A laminated structure comprising a core of an open cell product according to claim 9 and a load bearing surface skin of fibre reinforced material on at least one surface of the core.

15. A fine particle size semi-crystalline polymer product having a mean diameter of less than 5 microns, obtained by comminuting the products of claim 9.

16. A microfibril of a semi-crystalline polymer of section less than 0.1 microns prepared by comminuting the product of claim 12.

17. A drapable, composite structure comprising an open, fibrous structure of continuous filaments, of a polyarylene ether or polyarylene thioether wherein the structure contains 10 to 50% by volume of the polymer, at least 50% of the surface area of the filaments is coated by the polymer and the integrity of the structure is maintained by the polymer being attached at a plurality of points to two or more filaments.

18. A process according to claim 1 wherein the heating rate is between 10? C./hour and 100? C./hour.

19. A polymer product according to claim 15 having a mean diameter of less than 2 microns.

* * * * *